US006282697B1

(12) United States Patent
Fables et al.

(10) Patent No.: US 6,282,697 B1
(45) Date of Patent: Aug. 28, 2001

(54) COMPUTER PROCESSING AND PROGRAMMING METHOD USING AUTONOMOUS DATA HANDLERS

(76) Inventors: Wylci Fables; Jore Park, both of 214 Kawehi Pl., Kula, HI (US) 96790

( * ) Notice: Subject to any disclaimer, the term of this patent is extended or adjusted under 35 U.S.C. 154(b) by 0 days.

(21) Appl. No.: 09/157,212

(22) Filed: Sep. 18, 1998

(51) Int. Cl.$^7$ ..................................................... G06F 9/45

(52) U.S. Cl. .............................................. 717/1; 709/201

(58) Field of Search ................................ 717/1; 707/102, 707/10; 709/201; 714/38

(56) References Cited

U.S. PATENT DOCUMENTS

| 5,701,439 | * | 12/1997 | James et al. ............................ 703/17 |
| 5,768,505 | * | 6/1998 | Gilchrist et al. ...................... 709/201 |
| 5,893,106 | * | 4/1999 | Brobst et al. ......................... 707/102 |
| 5,937,189 | * | 8/1999 | Branson et al. ........................... 717/1 |
| 6,038,593 | * | 3/2000 | Huckins ................................ 709/217 |
| 6,067,545 | * | 5/2000 | Wolff ..................................... 707/10 |

OTHER PUBLICATIONS

"Microsoft COM, The Component Object Model: Technical Over", published in Dr. Dobbs Journal, Dec. 1994, 1996.
"IBM T Spaces Use's Guide", published/on the Internet, by IBM Corp., circa 1997, www.ibm.com.
"IBM T Spaces Programmer's Guide", published /on the Internet, by IBM Corp. circa 1997, www.ibm.com.
"White Paper: JavaSpaces", publ. on the Internet by Sun Microsystems, Inc., circa 1997, www.java.sun.com.
"Java Remote Method Invocation", publ. by Sun Microsystems Inc., 1995–98, www.java.sun.com.
"Contents of Connection Science", synopsis of "Integrating Neural and Symbolic Processes", Bookman & Sun, circa 1998.
"White Paper: What Is JNI?", publ. by Sun Microsystems, Inc., circa Jul. 1998, at www.java.sun.com.
"Schedules of Acitivity in the Swarm Simulation Systems", R. Burkhart, publ. OOPSLA '97 Workshop, Deere & Company.
"A More Complete Model of Relations and Their Implentation", Part 1 C. Bock & J. Odell, J. Object–Ori~nted Progr., 6/97.
"Toward a Formalization of OO Analysis", J. Odell & G. Ramackers, J. Object–Oriented Progr., 7/97.

(List continued on next page.)

Primary Examiner—Mark R. Powell
Assistant Examiner—Hoang-Vu Antony Nguyen-Ba
(74) Attorney, Agent, or Firm—Leighton K. Chong

(57) ABSTRACT

A computer processing and programming method calls for creating a plurality of software entities ("molecules") which can be dynamically configured to process data autonomously. The molecules can send and receive signals indicating the state of a molecule, whether or not a processing task is fulfilled, the results of a processing task, and whether or not the operation of a molecule is to be terminated, interrupted, reconfigured, or continued by creation of one or more "next" molecules. The molecules are created from a common set of software micro-components, which may be programmed in any programming languages to run in any operating system environments. The molecules may reside with a single computing resource, however, they are ideally suited to be deployed with distributed computing resources of different types on a network or in a parallel processing environment. An overall data processing task is performed by creating molecules in a "logic web" which can dynamically adapt to fulfill the task. Logic webs can be assigned to operate with different legacy systems, with applications programmed in different languages, and with data of any type stored in any format. As a result, data processing tasks in distributed or parallel processing environments can be performed much more efficiently, and entirely new types of data processing tasks can be undertaken.

20 Claims, 9 Drawing Sheets

OTHER PUBLICATIONS

"A More Complete Model of RElations and Their Implementation", Part II, C. Brock & J. Odell, J. Object–Oriented Progr., 10/97.

"Components: The Basics", J. Kain, Distributed Computing, QUOIN, 10/97.

"Distributed Computing Overview", T. Burghart, Distributed Computing, QUOIN, circa 1998.

"Software Components as Application Building Blocks", J. Kain, Distributed Computing, QUOIN, circa 1998.

"COM versus COBRA: A Decision Framework", O. Tallman & J. Kain, Distributed Computing, QUOIN, Sep.–Dec. 1998.

"The Common Object Request Broker", Ch. 1 & 2, Object Mgmt. Architecture Guide, ed. 7/95, rev. 2/98, www.omg.com.

"DCE Distributed Computing Environment, Overview", The Open Group, Inc., Cambridge, MA, 12/96, at www.opengroup.org.

"System Object Model (SOM) and Component Object Model (COM)" IBM Corp., 7/94, at www.software.ibm.com.

"Virtual Shared Memory", Scientific Computing Assocs., Inc., 1996–97, at www.sca.com, incl. "Linda Overview", "Paradise Overview", Piranha Benefits .

"Adaptive Parallellism with Piranha", N. Carriero et al., Technical Rpt. 954, Yale Univ., 2/93, republ. 2/94.

"REaltime Data Fusion/Software Backplanes, and the Process Trellis", M. Factor et al., Tech Rpt. 852, Yale Univ. Dept. of Computer Sci., 3/91.

"Multiple Trellises and the Intelligent Cardiovascular Monitor", Tech Report DCS/TR–847, Yale Univ., 2/91.

"Flow Based Programming", J. P. Morrison, 1st Intl. Workshop on Software Engr. for Parallel and Distributed Systems, Berlin, 3/96.

"Architecture and Complexity of Swarm–like Systems", Univ. Santa Fe, 4/95, at www.santafe.edu/projects/swarm.

Global Algorithm 1.5: The Nanotech Future: A Digital Conversation with BC Crandall, Kroker, 1992, at www.well.com/ bcc/Molecular Realities.html.

"An Organic User Interface for Searching Citation Links", JD Mackinlay et al., Xerox PARC, ACM, 2/95.

"An Introduction to Neural Networks", L. Smith, Univ. of Stirling, 10/96, to Iss@cs.stir.ac.uk.

"The Swarm Simulation System", N. Minar et al., Univ. SantaFe, 6/96, at www.santafe.edu/projects/swarm.

"Create–Phase Protocols for object Customization", R. Burkhart, paper for OOPSLA '95, 10/95, Deere & Company.

* cited by examiner-

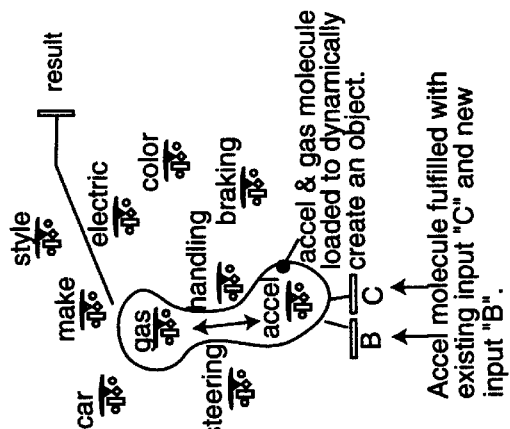
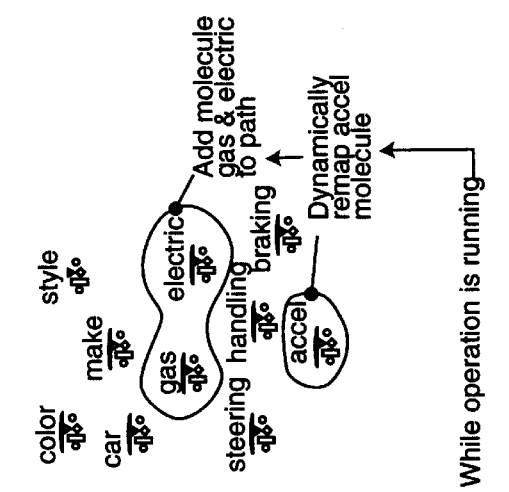
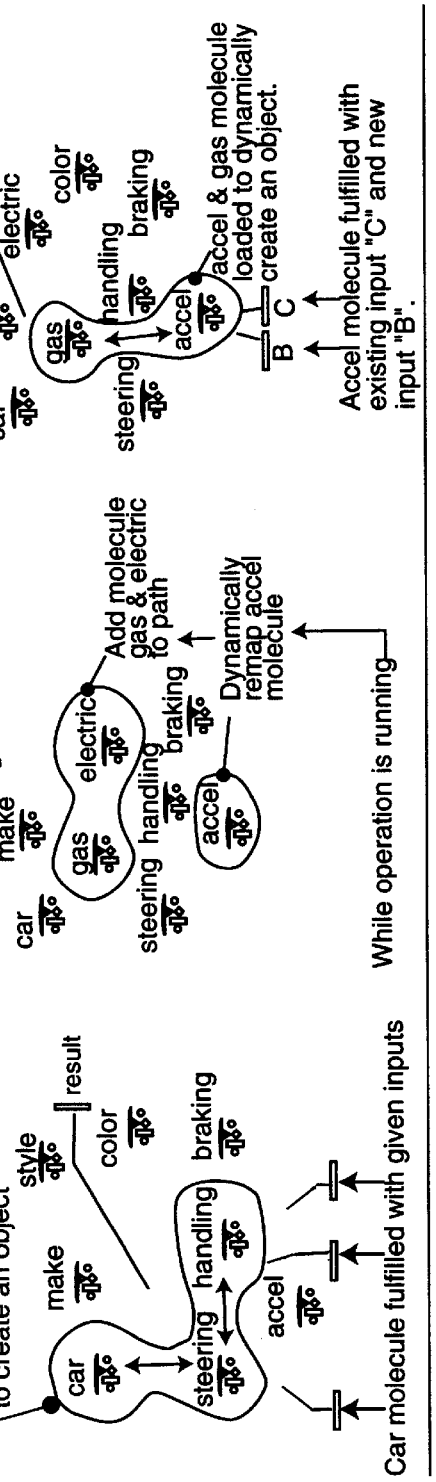
FIG. 5A
car, steering & handling molecule loaded dynamically to create an object
FIG. 5B
FIG. 5C
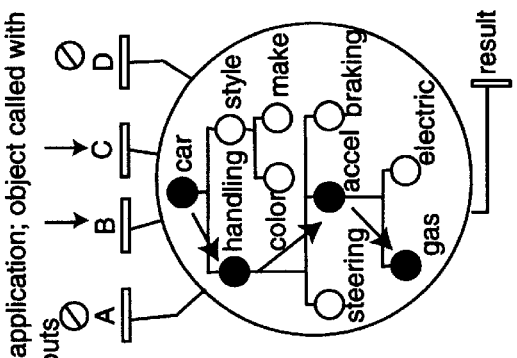
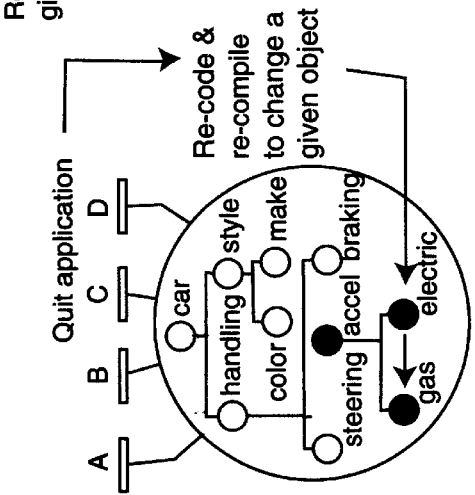
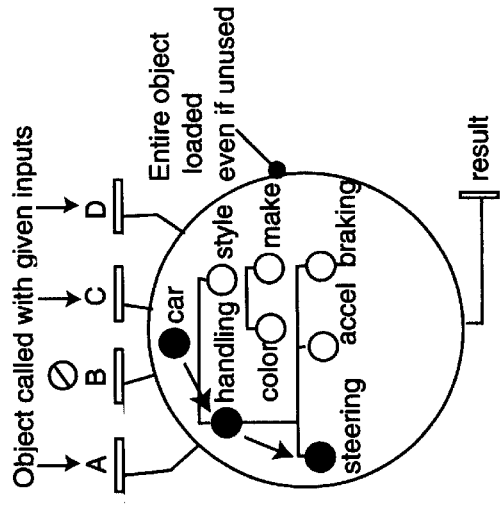
FIG. 5D
Object called with given inputs
FIG. 5E
Quit application
FIG. 5F
Re-start application; object called with given inputs

COMPUTER PROCESSING AND PROGRAMMING METHOD USING AUTONOMOUS DATA HANDLERS

TECHNICAL FIELD

This invention generally relates to computer processing and programming methods, and more particularly, to methods that employ a new type of autonomous data handlers.

BACKGROUND OF INVENTION

Computer processing has been developed from its earliest theoretical foundations to the present as a machine-oriented paradigm in which machine instructions are executed by a central processing unit (CPU) to convert raw data and input in sequential steps to a useful output. To accomplish more and more complex tasks involving greater and greater amounts of data, the development of computer hardware has proceeded with exponential increases in speed, power, and capacity, now approaching the physical limits of the atomic scale and the speed and wavelength of light. The programming of complex tasks by linear programming methods increasingly requires intensive code writing which can take up millions of lines of code and is susceptible to errors and cross-code conflicts which can require intensive debugging efforts. It also inherently requires that the programming be accomplished in one chosen programming language for a selected operating system, leading to obsolescence and legacy systems.

Object oriented programming (OOP) methods were developed to break up large programming tasks in modules that are self-contained and self-executing. Modules that have been optimized for specific functions can thus be catalogued and re-used in modular form in a variety of larger programming tasks. However, OOP methods require the enforcement of class definition hierarchies over a programming environment as a whole, resulting in closed systems and libraries of OOP modules that must be recompiled to support other environments.

Parallel processing methods were developed over the past decade in the attempt to obtain increased capability by breaking up a processing task into parts executed by an array of CPUs in tandem. However, conventional approaches to parallel processing have required centralized management and control of programmed tasks which imposes stringent requirements in the coordination and synchronization of tasks. Parallel processing methods to date have also continued to employ linear programming methods which are intensive and susceptible to fault, especially when operating in parallel, and are captive to the chosen programming language and operating system.

In recent years, with the rise of large-scale distributed networks, there have been proposals to perform very large or complex tasks by breaking them up into small pieces and distributing them among cooperating computers on a network, often referred to as "distributed computing" or "network computing". The proposals for distributed computing represent a shift in the computing paradigm from the processing of tasks of high computational intensity towards one in which data are widely distributed among resources on a network and processed locally with lower-intensity CPUs through distributed efforts. However, since the same linear programming methods and centralized management and control have been used, the distributed computing paradigm to date has also required stringent programming and coordination of efforts to achieve worthwhile results. The failure of one or more individual processing efforts or time delays associated with communicating or coordinating with centralized processing management can produce bottlenecks which bog down the effectiveness of this approach.

One method which has utilized multiple asynchronous computer processes is called "Flow Based Programming" ("FBP"), as explained in greater detail in *Flow-Based Programming: A New Approach To Application Development*, by J. Paul Morrison, published by Von Nostrand Reinhold, New York, 1994. The reference describes Flow Based Programming as being based on three principles, "asynchronous processes, data packets with a lifetime of their own, and external definition of connections". In FBP applications are defined as networks of "black box" processes, which exchange data across predefined conditions. FBP is a process of stepping tagged data packets through networks of "black box" processes and thus is a data-centric process. The FBP approach needs extreme predictive capability to work well.

Therefore, it is a primary objective of the present invention to provide a computer processing and related programming method which decentralizes the management of computer processing tasks and allows distributed or parallel processing of data to proceed autonomously with adaptive options such as taking the most efficient path available.

It is a further object of the invention to provide a new programming method which is optimally designed to facilitate parallel or distributed data processing by avoiding the need for captive programming environments such that simultaneous use of multiple programming languages can be supported and centralized processing management is eliminated. It is also intended to reduce the intensity and case specific nature of programming required for complex processing tasks and the susceptibility of such programming to fault.

SUMMARY OF INVENTION

In accordance with the present invention, a computer processing and related programming method calls for creating a plurality of software entities (referred to herein as "molecules") which can be dynamically configured to process data autonomously. The molecules can send and receive signals indicating the state of a molecule, whether or not a processing task is fulfilled, the results of a processing task, and whether or not the operation of a molecule is to be terminated, interrupted, reconfigured, or continued by creation of one or more "next" molecules. The molecules are created from a common set of software micro-components, which may be programmed in any programming languages to run in any operating system environments.

The molecules created for an overall processing task may reside with a single computing resource (CPU and database), however, they are ideally suited to be deployed with distributed computing resources of different types on a network or in parallel processing environments. Each molecule may be programmed in a programming language or languages suited to the computing resource where it is intended to operate. The molecules can function with a mixture of compiled or run-time compiled code, allowing them to run on a computing resource with only a portion of the process adapted to run on that computing resource. The molecules can signal each other and send and receive data using common network protocols. They operate to complete their respective data processing tasks autonomously until the overall data processing task is completed. An overall data processing task can be performed by creating molecules and structuring their operations and interactions in a "logic web" which can dynamically adapt to fulfill the task.

Adapted to a parallel processing environment, the molecules can be dynamically configured to run autonomously on parallel computing resources. A logic web is defined to allow efficient access of each molecule to a data object it is intended to process, and to any available processor of the parallel processor array as an interim CPU resource. The scheduling of processor access can be handled by a main controller program, or by a separate scheduler molecule or mini logic web. The molecules are programmed to signal their state, result, and termination, reconfiguration or generation of next molecules. The dispersed, autonomous operation of the molecules avoids the rigid scheduling structures and time delay conflicts in conventional parallel processing methods, in order to accomplish data processing tasks more efficiently and quickly.

As a software-configured entity, a molecule is comprised of the following basic software micro-components: a signal handler, an input handler, an interface handler, a method handler, an associated method, and an output handler. The signal handler is capable of sending and receiving signals for invoking other molecules and signaling other molecules and resources on the network. The input handler receives data input and puts the data in a queue. The interface handler determines when the inputs to the molecule satisfy a predefined condition in order to open a path to a method handler. The method handler processes the data sent from the input handler's queue according to a predefined method and sends an output to the output handler.

Adapted as a software programming method, a logic web of molecules is created to run on any available computing resources of any type and to process data in any format and in any location. Initialization files are programmed to create an initial host of molecules on the intended computing resources. The initial molecules operate to generate in the next molecules in successive layers or waves representing a progression of program steps. Each initialization file is structured to assemble the software micro-components of a molecule from a library of standard micro-component types. These standard types are chosen objectively in terms of their function, and are not rigid class types in an OOP hierarchy. New types of software micro-components can readily be created as needed and programmed in the programming language suited to the environment they are intended to operate in.

With the computer processing and programming method of the invention, complex computational and data processing tasks can be performed by designing logic webs constructed of component molecules that utilize any available computing resources of any type and in any location including on a network. Thus, for example, a logic web can be designed with molecules to operate with different legacy systems, with applications programmed in different languages, and with data of any type stored in any format. As a result, data processing tasks in distributed or parallel processing environments can be performed much more efficiently, and entirely new types of data processing tasks can be undertaken.

Other objects, features, and advantages of the present invention will be explained in the following detailed description of the invention having reference to the appended drawings:

BRIEF DESCRIPTION OF DRAWINGS

FIGS. 5A–5F illustrate a comparison of the programming method of the invention with conventional object-oriented programming.

DETAILED DESCRIPTION OF THE INVENTION

In the present invention, a new computer processing and programming method calls for creating a plurality of software entities ("molecules") which are programmed to process data autonomously in communication with other molecules and available computing resources. The molecules are created from a common set of software micro-components programmed in any programming languages to run in any operating system environments. They are configured in a logic web of molecules to perform a data processing task, which may be a component of an overall processing task. A logic web, or a web of logic webs, may reside in a single computer environment, but is particularly suited to be used in parallel processing and distributed processing environments.

Figure 1A:
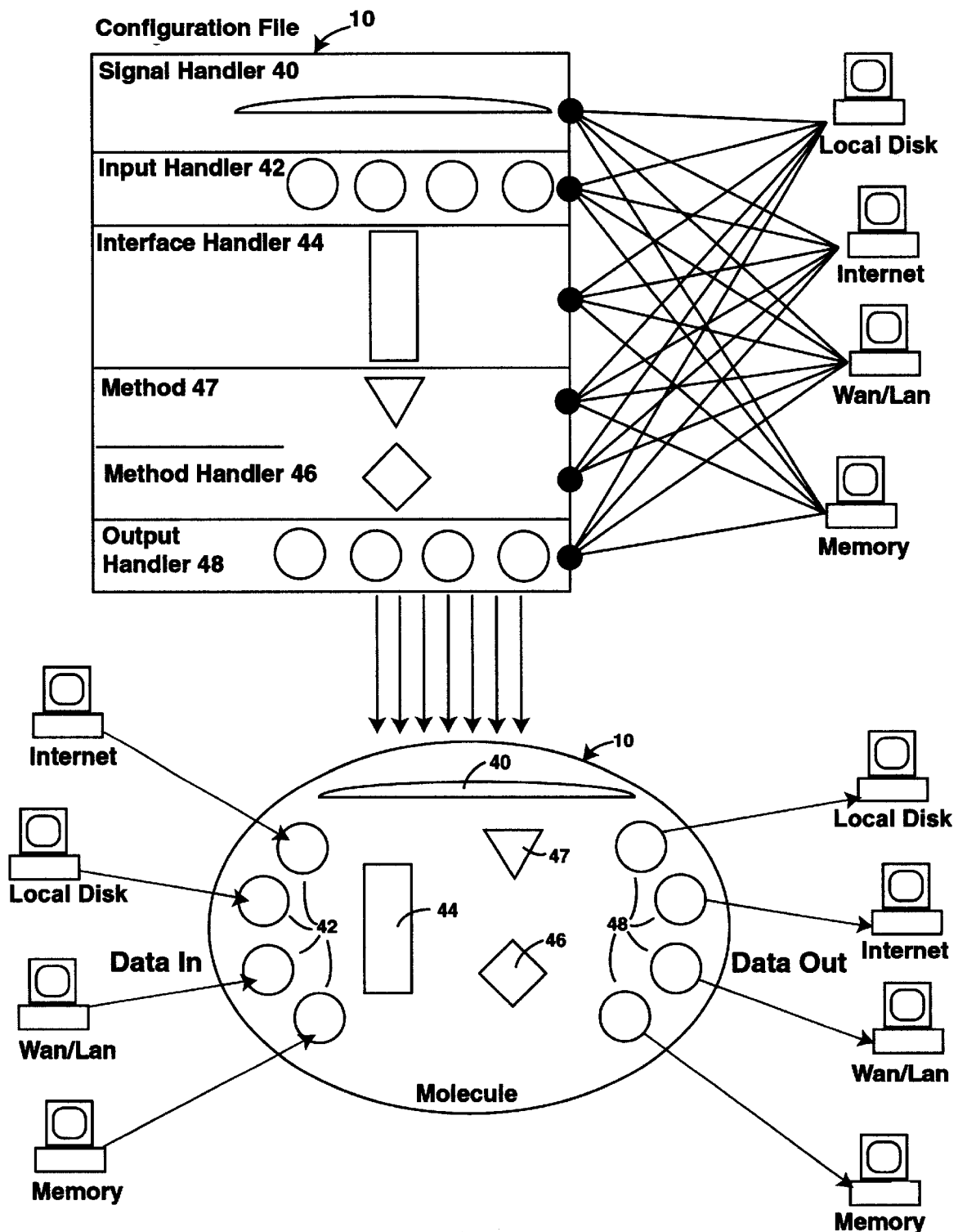
FIGS. 1A is a general illustration of a software entity ("molecule") in accordance with the invention.

Referring to FIG. 1A, a general illustration of a software entity ("molecule") 10 in accordance with the invention is illustrated. Each software molecule 10 is basically composed of its configuration (data) files, signal handler 40, input handler(s) 42, interface handler 44, method (47) and method handler 46, and output handler(s) 48 (to be described in further detail under the heading "Software Molecule" below). The molecule's components are gathered from local or remote sources and combined to create the molecule (described in further detail under the heading "Programming Method" below). Each molecule is programmed to process a defined data object autonomously, and can send and receive signals to and from other molecules with which it interacts in a logic web to accomplish a processing task. The logic web is assigned to run on any available computing resource, and communicates with other molecules in other logic webs via a communications bus within a computing environment and/or by network in a network environment (indicated by the connecting lines in the figure). Through a communications link, a molecule can send and receive signals to its signal handler 40, access data through any input source to its input handler(s) 42, and output data through its output handler(s) 48.

Figure 1B:
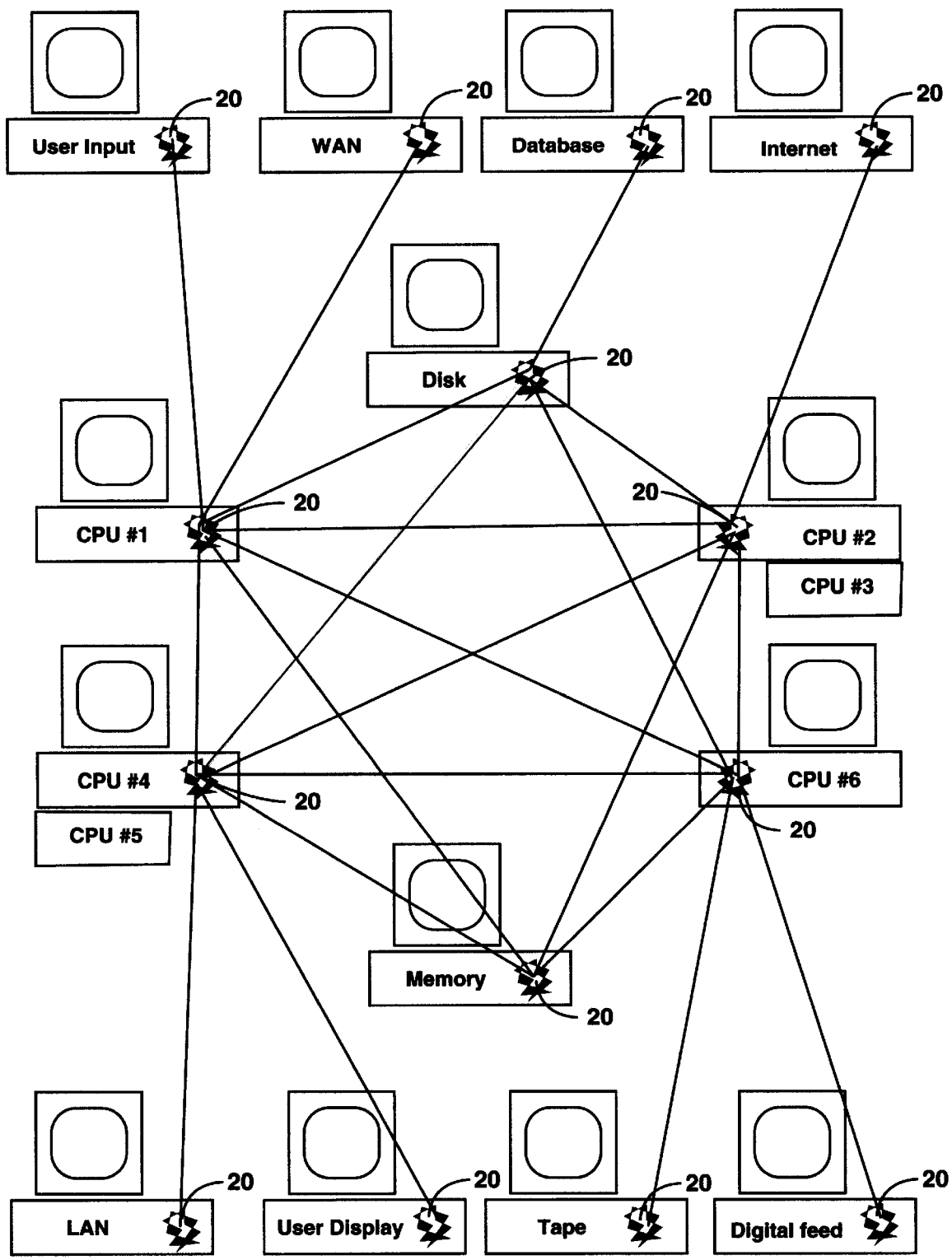
FIG. 1B illustrates deployment of logic webs of molecules in distributed computing or parallel processing environments.

Referring to FIG. 1B, deployment of logic webs 20 of molecules is illustrated for distributed computing environment. A multitude of distributed computing resources, in the form of local computers, LAN/WAN servers, CPUs, network servers, databases, I/O devices, etc., are connected by network of any type (indicated by connecting lines). The network may be a local area network (LAN), a wide area network, and/or a global network of networks (the Internet).

While an entire web of logic webs may reside at a single computing resource and communicate over a network with other computing resources having the data to be processed by the molecules, the efficiency of the system is greatly enhanced if the logic webs intended to process data at particular computing resources reside and process data locally at those computing resources and instead communicate their state information and results to other molecules via the network. Thus, for example, a molecule for processing COBOL-formatted data may reside at a COBOL server at which the COBOL-formatted data are stored, or a molecule for processing data in a JAVA space may reside at a computing resource having the desired data and a locally resident JAVA virtual machine. In this distributed mode, the locally resident logic web of molecules may be programmed in the programming language used at the computing resource where it resides, so that it can readily be operated in that environment.

A logic web, or web of logic webs, may similarly be deployed in a parallel processing environment having an array of CPU resources (indicated by CPU#1, . . . , CPU#6) and associated databases and I/O devices. The logic web is structured to allow efficient access of each molecule to a data object it is intended to process. Access of a molecule to CPU computing resources may be scheduled by a resource manager molecule or logic web. Alternatively, it may communicate with a CPU scheduler such as conventionally used in parallel processing environments. Since the molecules are designed to process data autonomously, they can operate without having to be monitored and controlled by a centralized processing management. The molecules signal their state information, results, and termination, reconfiguration or generation of next molecules to other molecules or logic webs set up in the system. However, it is also possible to have the logic webs communicate with a conventional controller program in a hybrid arrangement.

Software Molecule

Figure 2:
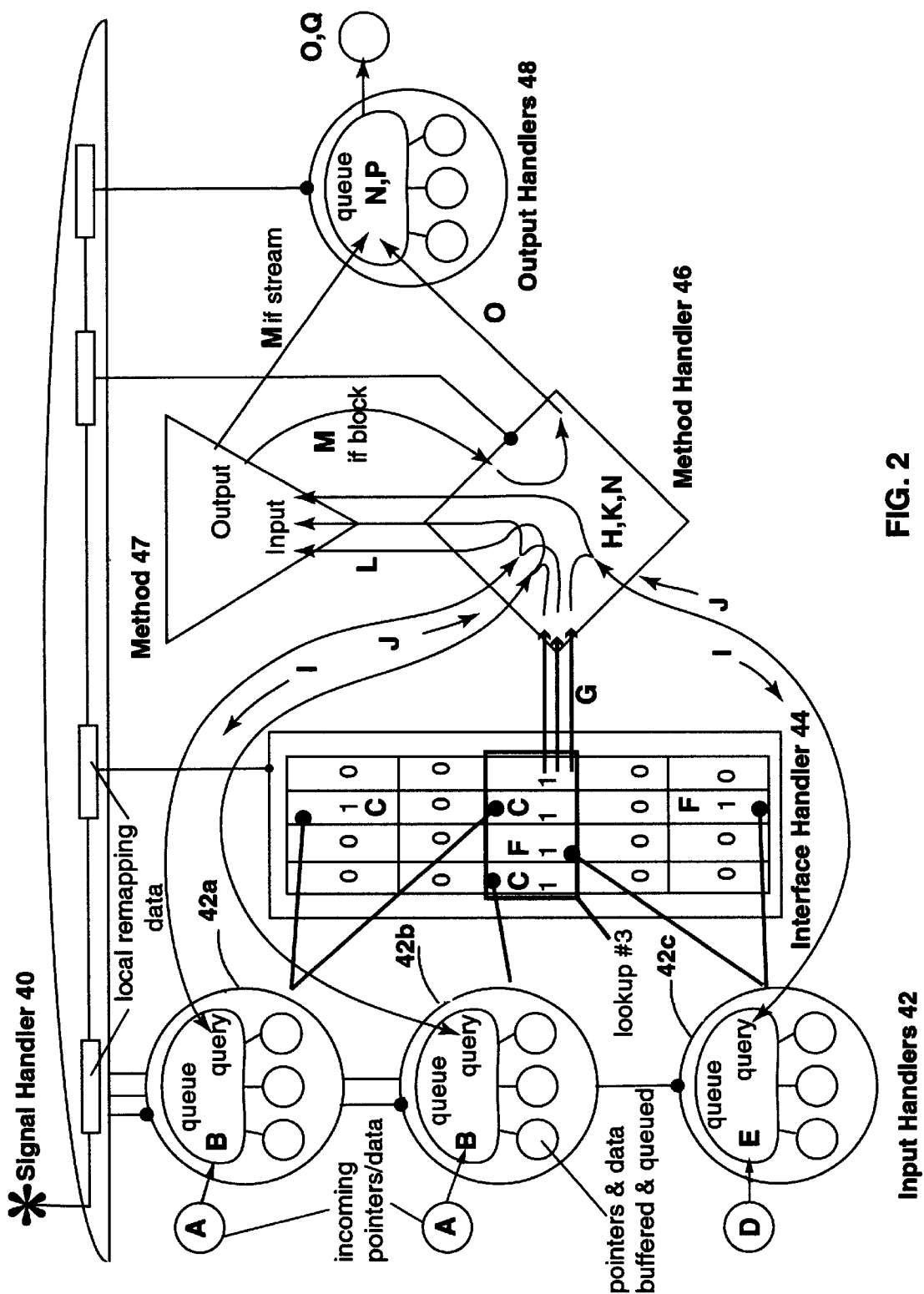
FIG. 2 shows a preferred example of the structure for a software molecule of a basic type having signal handler, input handler, interface handler, method handler, and output handler micro-components.

Referring to FIG. 2, a preferred structure for a software molecule of a basic type is shown having a signal handler 40, input handlers 42, a data interface handler 44, method handlers 46, and output handlers 48. The signal handler 40 is capable of sending and receiving signals to and from other molecules and other resources on a communications bus or network, similar to decentralized broadcasting of signals on a CB or private radio network. The signals are broadcast in a common protocol used on the communications bus or network, e.g., the TCP/IP protocol used on for Internet communications.

The signal handler 40 can perform the following basic routines in the system:

1. Read the configuration file from the data source. The configuration file contains names, attributes and type of the molecule's sub-components.

2. Build the molecule by assembling the sub-components as defined in the configuration file. Loading or invoking a sub-component proceeds by calling the name and type for the component from a local or remote source having a library of files for the handler types stored. The component file is passed to the signal handler and added to the molecule.

3. Select the signal environment. The signal handler listens to the signal environment specified in the configuration file.

4. Kill, suspend or restart the molecule.

5. Send signals to and from the signal environment specified.

6. Interpret signals it receives, and deliver the signals to the appropriate sub-components of the molecule, including the capability to reconfigure. The signal handler can send requests to the sub-components. Examples of signal handler requests include: (a) to the input handler or output handler to reduce queue size; (b) to any of the five sub-components to write out their state and then die; (c) to cue or mandate a re-mapping of any of the five sub-components; (d) to modify buffer size or memory use.

7. Call to load the "next" or other molecule. The signal handler looks at specified name registries to see if the "next" molecule already exists. If it does exist, then the signal handler will cause that molecule to remap, or alternatively, if it is specified, it will not call the "next" molecule. If it does not exist, it calls for the creation of a new signal handler which will load the "next" molecule. The new signal handler is not a child thread, but rather a completely separate and unique new entity. This is differentiated from other programming paradigms, in which all threads are children to a primary parent thread, which together form an application.

The sending and receiving of signals of the signal handler can be implemented in any manner appropriate to the communications or "signal" environment of the computing resources where the molecule resides. In a conventional computer or network environment, the signal handler can issue or receive a "signal" as a data packet addressed to a specified molecule in the system or on the network. A signal from a signal handlers may be routed to a target molecule based upon its address as maintained in a name registry. The name registry may be maintained by another molecule or logic web, or a conventional resource register. For example, conventional data sharing environments, such as the JAVA™ Shared Data environment, have registers for servers, clients, and data channels set up for given applications. A signal handler can also "listen" to the signal environment for a global broadcast to all molecules, or it may tune into a specified channel as is listed in the configuration file, or wait for any signal from any specified signal environment, or may be tuned along with a group of other molecules in a logic web to the same channel.

The handler components of a molecule are structured as a common set of types that can be invoked to create or dynamically configure a molecule. The molecule can be assembled by signaling the names of the desired handler types in order to retrieve the corresponding section of code from stored memory. In this manner, any number of types of input and output handlers can be accessed depending on the correct type of the data source or memory model. Similarly, a molecule can be configured with many different types of method handlers. When an interface handler is supplied with new configuration information, the new information as to which types of method handlers to invoke for given conditions is stored, so that the molecule can execute the new method when these conditions exist. The appropriate section of source or object code for any of the five component handlers of a molecule can be accessed from stored files via local memory, LAN, WAN, or Internet.

A rudimentary example of a range of handler types and attributes, such as may be referenced in the molecule configuration files, is shown in the listing provided in Appendix I. It is to be understood, however, that the number, types, and attributes of handlers that may be created are unlimited, and can be expanded commensurately with the needs of programmers for accommodating different types of memory models, data sharing environments, and computing resources.

The input handler 42 establishes the molecule's connection to data sources from specified types of memory models, as determined by the programmer. By design, the input handler thus allows interface to data sources of any memory model. It queues incoming data sources to the extent the queue will allow, as is determined by the type of input handler chosen, then registers with the interface handler 44 that it has queued data. The input handler also allows other sub-components of the molecule to query for its data. In the example shown, incoming pointers to memory or data "A" are accepted in the queue "B" of input handler 42*a*, and also of input handler 42*b*, and incoming pointers/data "D" are accepted in the queue "E" of input handler 42*c*.

The type of data source that may come in to any input handler is determined by the type of input handler assembled in the molecule. Each type of input handler can specify a particular data channel of a given memory model for how it will accept data. For example, the memory model and data handling functions of a conventional data sharing environment such as Java Shared Data Toolkit (JSDT™), of Sun Microsystems, Mountain View, Calif., may be used. When the input handler is generated, the specified data channel is registered for the memory environment of the system. Data coming from a source (another molecule or a third party client in the system) on the specified data channel can then be routed to that input handler. By making a choice of an input handler for a specific data type, the need to do data type checking at run-time is avoided. Various types of input handlers are written to accommodate various file types to be handled. In the preferred structure, once an input handler has accepted a data source and begins to process data, the data will be "typeless" until the output handler formats or types the data to interface to a given environment. The advantage of using multiple input handlers is to allow simultaneous access to data sources from multiple memory models that are to converge and be processed in the same molecule.

The interface handler 44 performs a central function for the molecule by determining when the inputs to the molecule satisfy one or more predefined conditions. By allowing the molecule to await the inputs fulfilling a predefined condition, rather than having to be directed by instructions and monitored by a centralized processing management, the molecule has the ability to wait, look, and proceed, so that it has the characteristic of acting autonomously. This is differentiated from a code instruction of conventional linear programming, which is written to execute a specific task at a specific time in a specific sequence. The predefined condition may be the presence of all of the required data inputs to the input handler. Alternatively, it may include the presence of a signal received by the signal handler. The interface handler may also be dynamically reconfigured by signals received by the signal handler, in order to change the predefined conditions to invoke a method, the method for a given set of conditions, or the output handlers to be invoked to handle the results The interface handler can have predefined input conditions for each of a plurality of different method handlers and associated methods, depending upon which input data sources are present. The molecule has a plurality of lookup tables within the interface handler awaiting indications from one or more input handlers. An interface handler will wait until all inputs specified in the lookup table are met before facilitating communication between the input handler and the method handler.

The interface handler may use any suitable means for monitoring the multiple input conditions to determine when the requirements of a predefined condition have been met. This function may be implemented by the software equivalent of a bit array, bar table, or switch array. When all required input conditions are met, the interface handler 44 calls the respective method handler 46 and passes it the appropriate references for invoking the associated method 47. In the example shown in FIG. 2, the input handlers 42*a* and 42*b* communicate to the interface handler 44 that the correct pointers/data sources are queued, resulting in specified flags in the bit array being set to "1" to indicate the input condition "C", and the input handler 42*c* sets the flag bits for input condition "F". The fourth flag bit in the third row of the bit array is set to "1" by the presence of another input condition, for example, a signal sent to the signal handler 40. With all required flag bits set to "1" in the bit array's third row, the interface handler 44 opens a path "G" to invoke the appropriate method handler 46, which then calls the associated method 47 for processing the inputs to the output handler 48.

Figure 3:
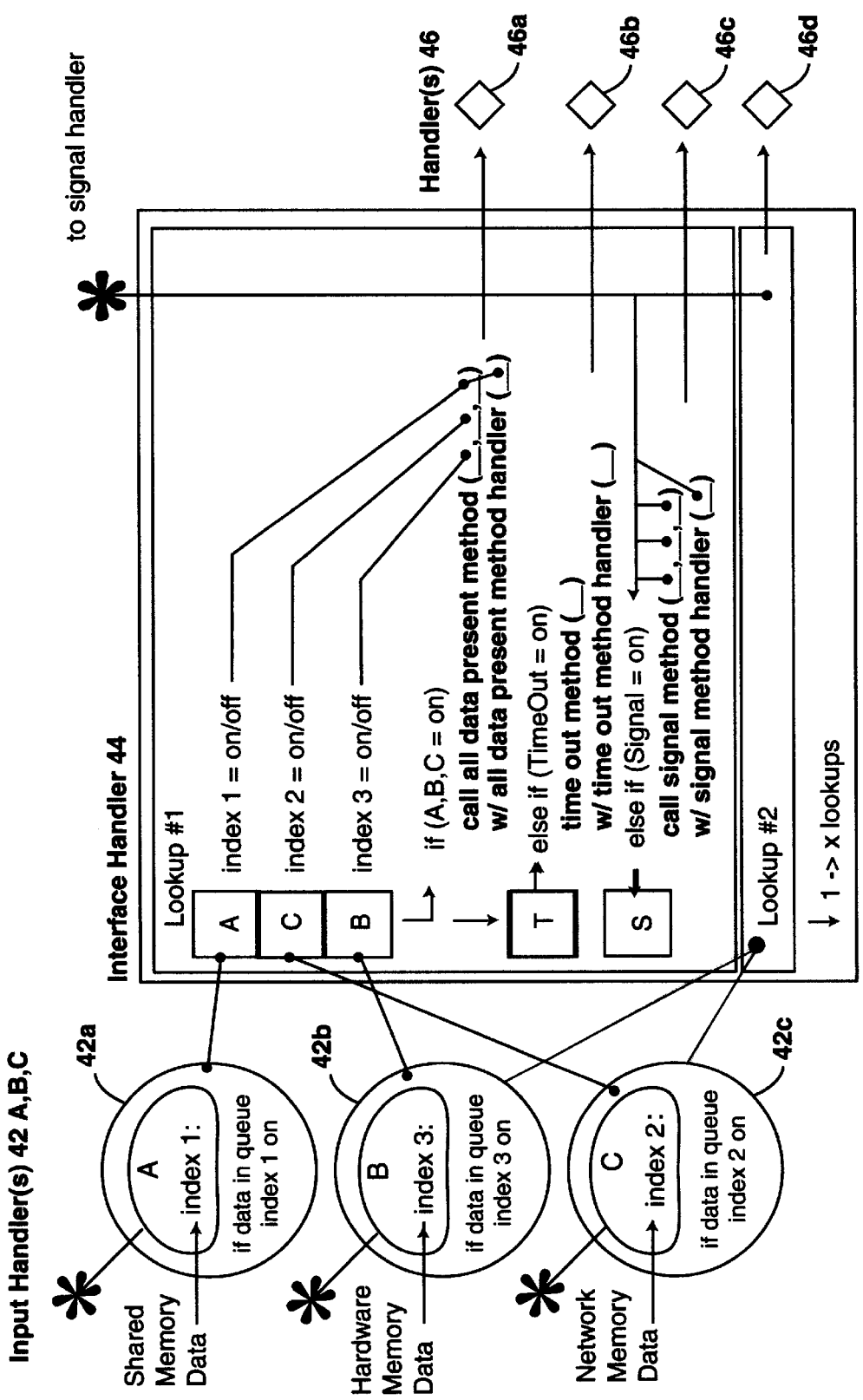
FIG. 3 shows the logic operation of the interface handler of the software molecule in greater detail.

In FIG. 3, a more detailed example of the logic operation of the interface handler is depicted. The interface handler 44 stores the predefined inputs necessary to a first condition indicated as "Lookup #1". Lookup #1 specifies what events will occur under the predetermined conditions for the interface handler 44, including "all data present", "timeout", and "signal". The interface handler 44 may have one or more lookups. In this example, Lookup #1 depicts an interface handler dependent upon the presence of three data sources, i.e., Shared Memory Data A, Hardware Memory Data B, and Network Memory Data C. In Lookup #1, index 1 is set on/off depending if Shared Memory Data A is present or not, and, similarly, index 2 for Hardware Memory Data B, and index 3 for Network Memory Data C. When all data are present, the interface handler calls "all data present" for the appropriate method handler 46*a*. As a default condition, the index for "TimeOut" is set to "on" to invoke method handler 46*b*, if a specified time interval has passed without all data input conditions being met. As another default condition, the index for "Signal" is set to "on" to invoke method handler 46*c*, if a specified signal is received by the signal handler 40 before all data input conditions are met. Lookup #2 is shown as dependent upon two data sources, Hardware Memory Data B and Network Memory Data C. The interface handler knows at all times which of the associated input handlers 42 have data, because when an input handler receives new data, or no longer has data, it notifies the interface handler.

Referring again to FIG. 2, when the predefined input conditions are met, the respective method handler is invoked (types "H", "K", and "N" for the three sets of predefined conditions), calls the associated method 47 or processing step to be performed on the input data, and provides the input data from the input handler 42 to the method 47. The input data can be handled as a block, via path "G", or as streaming data. If the input data is to be streamed, method handler sets up input paths for streaming handled by queries "I" from the method handler and input responses "J" from the input handler. For a block of data, the method 47 returns an output M to the method handler 46, which sends it on to the output handler 48 and then attends to cleaning up after itself. For streaming data, the output M is sent directly to the output handler 48 until termination of the method. Examples of a method may be computing an arithmetic sum, sorting data, performing a Boolean operation, etc., and may include an entire third party application.

Figure 4A:
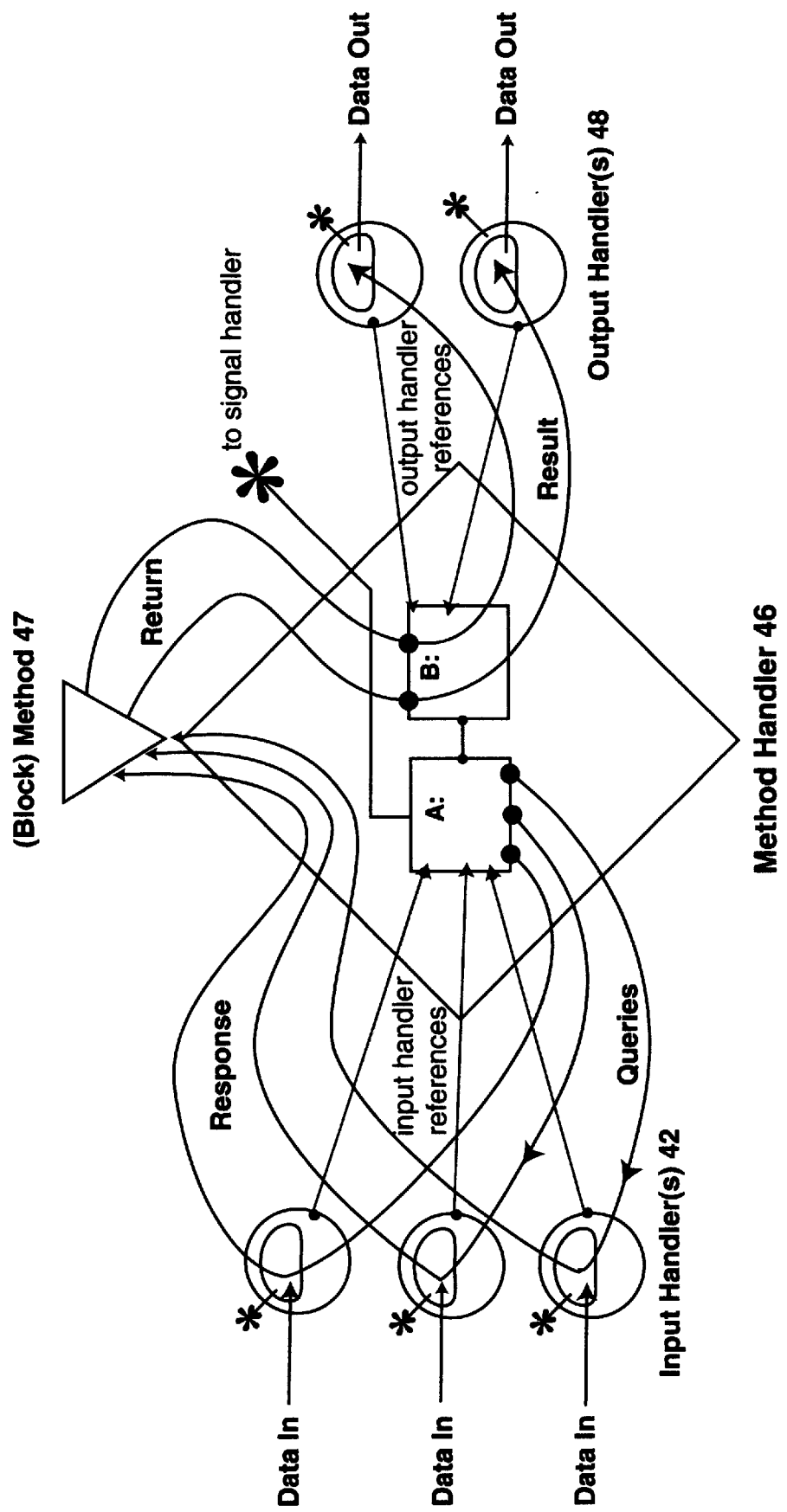
FIGS. 4A and 4B show examples of two method handling types, block method handling and streaming method handling, respectively.
Figure 4B:
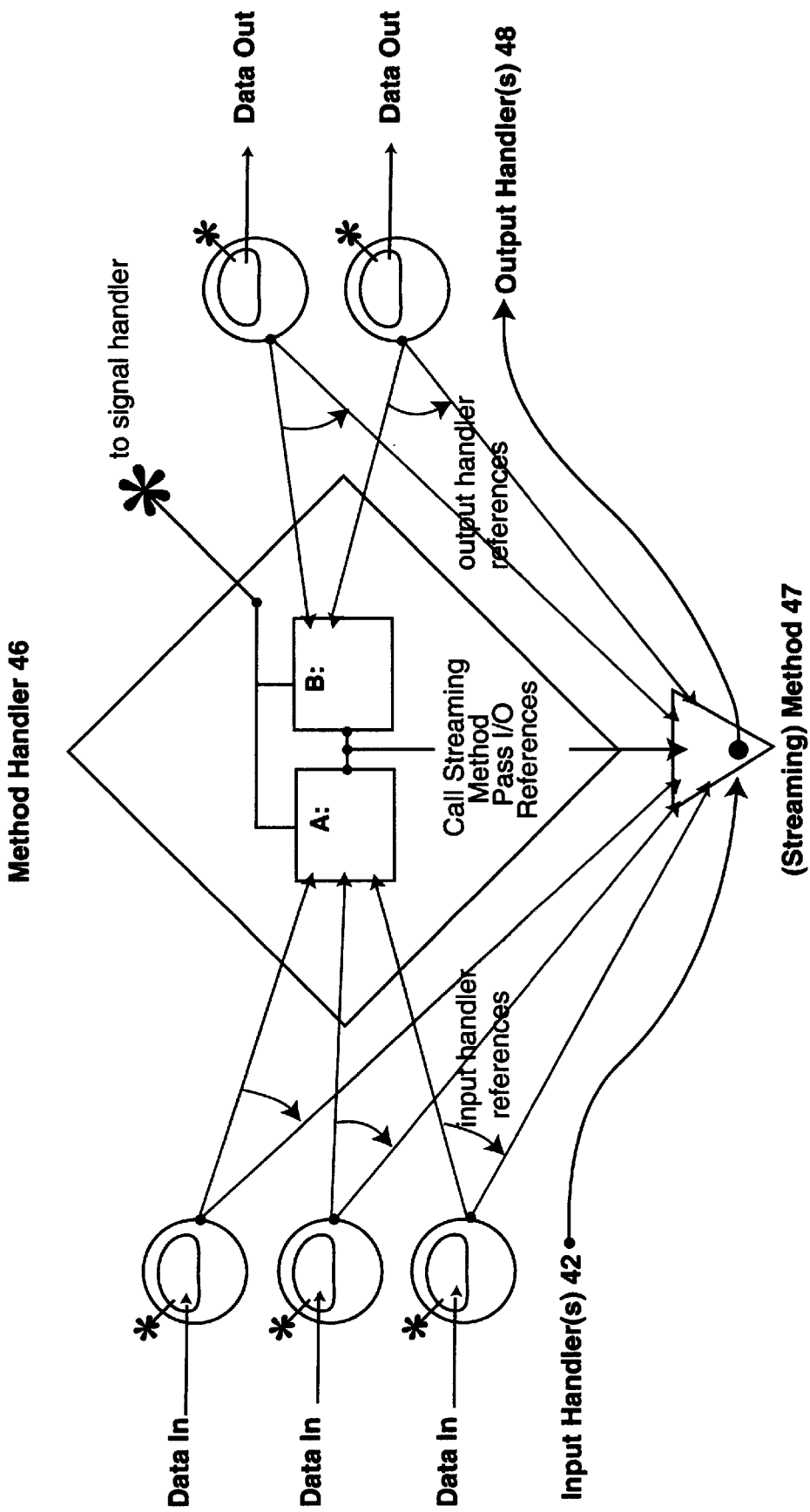

FIG. 4A and 4B show examples of the two method handling types, block method handling and streaming method handling, respectively. In block method handling, the method handler 46 has received from the interface handler 44 the references to the incoming data that it will need to call a method 47. The method handler 46 then queries the incoming data from the input handlers 42, calls the block method 47, and passes the responses to the method 47. The method handler 46 then waits for the method 47 to return its results. It then acquires output handler references from the output handlers 48, and sends the results to them. If the references do not exist, the method handler can create (invoke) the output handler. The data then is passed to the output handler 48, and the method handler 46 exits.

In streaming method handling, the method handler 46 has received from the interface handler 44 references to the incoming data that it will need to call a method 47. Output handler 48 references for outgoing data are also acquired or created by the method handler 46. When the predefined conditions are met, the streaming method 47 is called, and the input and output handler references are passed to the streaming method 47. The streaming method 47 can then receive data from the input handler 42, process it, and produce it directly to the output handler 48. Utilization of the method handler 46 in this streaming fashion allows the molecule to act as a "connection engine" which allows a logic web to string together dynamic chains of methods 47.

The output handler 48 establishes the appropriate connection to a data channel in the type of memory environment the output will be provided to, as determined by the programmer. If a data channel for output is not specified in the configuration file for the output handler, the output handler can be enabled to create a data channel at run time in response to the conditions that exist. By design, the output handler thus allows interface to any type of memory model. It queues outgoing data sources to the extent to which the queue will allow, as determined by the programmer in accordance with the type of output handler chosen.

The advantage of using output handlers is to allow simultaneous distribution to multiple memory models for input data which have converged and processed in the same molecule. There can be many types of output handlers. Particularly advantageous is the use of input and output handlers for shared-memory computer systems. Instead of moving actual data, pointers to the data or processes can be moved within a molecule or from one molecule to another, for another or the next molecule to operate on. This gives the molecule a speed advantage over conventional object-oriented programming (OOP) methods. OOP methods can pass a pointer too, but the pointer has to be processed through the OOP program to find the pointer. In contrast, a molecule can accept a raw pointer from another molecule and proceed directly with the next operation.

As determined by the programmer, each molecule is provided with the micro-components that allow it to act autonomously to process the required data by a defined method to the intended output. Data are moved to and from molecules on specified data channels in whatever data sharing environment the logic web has been contructed for. If any data are not available, the molecule will simply wait, and does not have to be instructed what to do next. Each molecule may be given a unique name, which is maintained in a name registry. Any molecule can thus signal that molecule by its unique name, and an additional molecule of the same name cannot be created in the same registry.

The processing of a molecule may be terminated at any time by sending a termination signal to the signal handler 40. At any point in their existence, a molecule can be stopped and reconfigured for a different mode or method by a reconfigure signal sent to the signal handler 40. The molecule can also be signaled to write out its current configuration (state information), so that the state of processing can be analyzed for any point in time. In contrast, a conventional program does not maintain dynamically changing state information, and therefore cannot explain what is running at any particular time.

In the event that any or all of the five sub-components of a molecule receive a "kill" signal, and the handler types selected support retaining information as to the state of the processing, the handlers will write their state information to a molecule configuration file that can be reloaded. Thus, if the system fails for any reason, the state information can be obtained from the molecule, and used to re-create the state of each molecule and the entire logic web. This allows a system administrator to locate where or how a failure occurred, and also to load that configuration file into another molecule in order to resume processing once the failure has been corrected. The ability to rebuild the "state" of a process (logic web) is different than in other programming paradigms. In the event of system failure, typically the entire process would have to be restarted from the beginning, and stepped through one execution at a time until failure is reached. With the programming method of the invention, using the logic web, the process can be recreated just prior to the point of failure, allowing for greatly increased speed of diagnosis.

The configuration file of a molecule specifies what run-state the molecule will run as, e.g., "run once", "run until out of data", or "run until signaled to die". A molecule may dean itself up when it has completed running once, when there is no longer data in its input handler and output handler, or when the signal handler receives a signal to kill the molecule from the signal environment. This can be accomplished by erasing the software file, or disabling its executable code. The integrity of the logic web can thus be maintained by taking care of "clean up" on a per molecule basis. Incorrect data or state information are not left behind after termination where they may corrupt other handlers. Clean up at the molecular level also allows for efficient memory usage and removes the need for periodic global clean up routines. Molecules are only loaded for the required run-time, thereby freeing machine resources immediately upon termination of the molecule. For streaming methods, a molecule can be created that will use the available resources to stream data so long as provided, at which point the machine resources are freed. If the necessary life span of the molecule is to be determined dynamically, the programmer can instruct the signal handler to listen to the appropriate signal environment to receive kill signals. The kill signal can be sent to each of the sub-components of the molecule for cleaning itself up, which may involve writing out their state for future reference. The unique ability of this programming method to clean itself up with each molecule (each data processing substep) makes for efficient use of machine resources. In other programming paradigms, although some cleaning occurs during run-time, the bulk of the machine resources are not freed until the application exits.

Logic Web Programming Method

The programming method of the present invention calls for the construction of one or more logic webs to perform incremental processing steps of an overall processing task. The design of a program to accomplish a processing task through a set of incremental processing steps is a matter of skill, ingenuity and artistry in the programming field, and is beyond the scope of this description. The fundamental characteristic of the new programming method is the creation of a logic web operatively connected to a computing resource which is composed of a plurality of molecules which can perform data processing steps autonomously. The particular structure of a logic web depends upon the processing task it is required to perform (a specific example is described under "Data Synchronization Example" below). The basic element in the creation of a logic web is the creation of at least one molecule having the basic five sub-components described above.

To program molecules, a programmer is provided with a library of handler types from which to create molecules. The programmer first determines what data sources data are to be obtained from, such as stored files, Internet directory, JSDT™ space (trademark of Sun Microsystems, Mountain View, Calif.), IBM Tubule™ space (trademark of IBM Corp., Armonk, N.Y.), etc., and what method is to be used to process the data. The programmer picks the appropriate input and output handler types which match the data environments where the data sources are located or will reside, and then selects the appropriate interface handler. The programmer configures the interface handler by deciding which input conditions need to be satisfied in order to call a method handler. The programmer then selects the name of the method that will be invoked, and which output handler(s) match the environment(s) the processed data will be sent to. The programmer determines whether the molecule will run once, run until out of data, or run until signaled to die. The programmer also determines whether to use a timeout period, what the timeout method is, and what method to call when a signal of a certain type is received. Finally, the programmer defines which additional or next molecules will be loaded, and which signals are to be used in order to remap this or other molecules.

This results in one molecule unit. The programmer saves it as one initialization file and gives it a unique name that is logged in a name registry. The programmer follows a similar process for each molecule to be created in the logic web. As this paradigm of programming method is further developed, standard initialization files for optimized molecules and even whole logic webs can be stored in libraries for programming use. The development of libraries or lists of handlers is expected to allow a layperson to create fully operating molecules or whole applications without writing a line of code.

The result of programming a data processing task by the programming method of the present invention is a program which executes by creating logic webs of molecules which can autonomously process data at any computing resources to which they are assigned without the need for centralized processing management. A further important feature is the ability to dynamically reconfigure one or more molecules of a logic web to change its data processing function, either as a run-time change, or as a development or extension of the program, or as a correction of program failure.

The execution of the steps in a processing task are accomplished through the generative actions of the signal handlers. As a signal handler is generated, upon the reading of its configuration file, it forks and creates any other molecules indicated in the configuration files. The signal handler may also remap its molecule to another molecule name, or another method may be called. Thus, each layer of molecules builds the logic web "out ahead of itself". As a result, the successive layers of molecules will be generated, then will sit and wait for their input conditions of available data sources to be fulfilled.

FIGS. 5A–5F illustrate a comparison of the logic web programming method of the invention with conventional object-oriented programming. This example uses a simplistic comparison of the data processing task of searching automobile data according to given search inputs. The data processing program is set up to perform searches of the database by one or more categories of car type, make, style, steering characteristics, handling characteristics, color, braking characteristics, and acceleration characteristics. The effects of the logic web programming method are shown in FIGS. 5A–5C, and the object-oriented programming method in FIGS. 5D–5F.

In FIG. 5A, the Car molecule is loaded. When the Car molecule is fulfilled with the search inputs A, C, D, it calls for the creation of the Handling molecule, which in turn calls for the creation of Steering molecule. The inputs are delivered to the Steering molecule, which processes them and returns a result. In the object oriented programming method, shown in FIG. 5D, the entire Car object is loaded, and inputs A, C, and D are passed to the Car object. The hierarchical elements, or classes, of the Car object, i.e., Car type, Handling, and Steering process the inputs, producing a result.

FIG. 5B shows how in the logic web programming paradigm, it is not necessary to quit the running operation in order to change the functional characteristics of that operation. Gas and Electric (power) molecules are added and made accessible to the operation. A remapping signal is sent to the Acceleration molecule so as to accommodate the new molecules added in the event that acceleration is called. In the object oriented programming method, as shown in FIG. 5E, the running of the operation must be exited, the source code acquired for the entire Car object, the Gas and Electric objects edited for their place in the hierarchy, and the Acceleration object edited to accommodate the hierarchy change. The object code must then be recompiled, in which event any other source code or object code to be used in the operation must also be edited, recompiled and re-linked.

In the last example in FIG. 5C, the Acceleration molecule in the logic web programming method is now running. When the Acceleration molecule is fulfilled by new input B and existing input C, the Gas molecule is called, and the data is delivered and processed, returning a result. In the object oriented example in FIG. 5F, the operation is restarted, and the entire Car object is reloaded. Inputs B and C are passed to Car object, and the hierarchical elements, or classes, of Car type, Handling, Acceleration, and Gas process the inputs, producing a result. This shows that in the logic web programming method a system can dynamically adapt to new parameters which are applied while the system is running. This eliminates have to re-code and compile to continue run operations.

Compiling and Run Time Operation

In the logic web programming method, an overall processing task is accomplished by designing a logic "web" of interacting molecules which can autonomously perform the required processing of data sources to a final result. The web of molecules is generated at run time from initialization files written by the programmer which are distributed among the computing resources participating in accomplishment of the overall processing task.

The initialization files generate an initial cohort of molecules to start the processing task. Utilizing the available computing resources of a local CPU and associated databases, the molecules remain in operation until they are terminated, run out of data, or are reconfigured. During operation they may be used to invoke other molecules at any time. In this manner, they act like autonomous elements in a dynamic environment. However, rather than chaotic, their operation is purposeful and in parallel everywhere at once.

This new paradigm of computer processing results in optimally efficient distributed processing, as well as the capacity to do true parallel programming and processing. It will process data from disparate sources at once, in addition to being able to make use of any machine on a network no matter what its type or operating system environment.

In a preferred implementation, the handlers are assigned unique type names and are written in object or source code. Handlers of the same type may be written for many types of programming environments expected to be encountered, so that the correct code type can be invoked to run on the intended local computing resource. For example, they may be written in the program language used for the operating system of the local computing resource they will run on, or they may be written in a portable meta language such as JAVA™ script (trademark of Sun Microsystems, Mountain View, Calif.) to run on an executable component GAVA virtual machine) within that operating system environment.

The initialization files for generating the molecules of the logic web exist physically as relatively small files stored on disk or in memory or transmitted via network to the local computing resources. They are run as executable files that are read into RAM of the local computing resource and executed like other compiled programs. If the molecule is intended to be deployed in the Internet environment, the code files can be retrieved from a URL address, or obtained from a local directory, e.g., /usr/lib/java.

The initialization files operate to assemble each of the initial cohort of molecules by invoking the component handler names. When a handler name is invoked, the file containing either source or object code is retrieved from stored handler libraries (either locally or remotely), and assembled to form the molecule. This results in much more flexible run-time operation than in conventional OOP methods where entire objects are written in completely assembled blocks, or other programming languages which write source code that first have to be compiled to run.

Figure 6A:
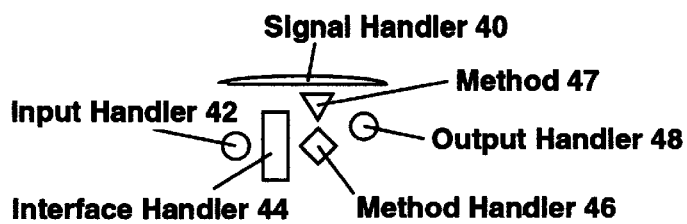
FIGS. 6A–6D illustrate the step by step run-time execution of three basic types of molecules, the Block Process, the Streaming Process, and Streaming a Block Process.

FIGS. 6A–6D illustrates the step by step run-time execution of three basic types of molecules, the Block Process, the Streaming Process, and Streaming a Block Process. In FIG. 6A, the basic parts of a molecule are shown, including signal handler 40, input handler 42, interface handler 44, method handler 46, method 47, and output handler 48. The initialization file for the molecule builds the signal handler 40 first. The signal handler 40 starts up and notifies the name registry for the overall program. If the name already exists, it will either ignore the request to create the molecule, or remap the existing molecule. Dynamic naming conventions may also be used to eliminate the need to maintain a centralized name registry. The signal handler 40 then invokes the input and output handlers 42 and 48 and the interface handler 44. At this point, there is a running molecule that is waiting for input. It should be noted that at any step the signal handler can mandate or queue a remap of all the attributes of the input and output handlers, interface handler, and method handler, or it can suspend, resume, or terminate a unit.

Figure 6B:
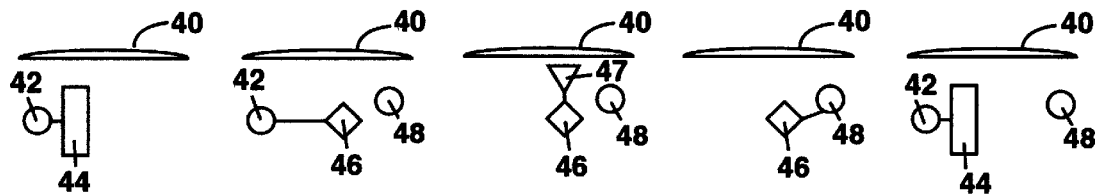

For a Block Process as illustrated in FIG. 6B, the molecule waits in Step A for the input handlers 42 to register with the interface handler 44 that they have data. When the interface handler 44 is fulfilled, it proceeds to call the method handler 46. In Step B the method handler receives the input handler references, output handler name(s), and the method name from the interface handler. The method handler queries the input handler for the input data as a block.

In Step C the method handler calls the method 47 and passes the input data response, then waits for the method to return a result. When a result is returned in Step D, the output handler references are acquired by the method handler. If it does not exist, the method handler creates an output handler 48. It then proceeds to pass the result to the output handler. In Step E the output handler 48 sends the data to its output environment, and the molecule returns to waiting for the input handlers to queue more data.

Figure 6C:
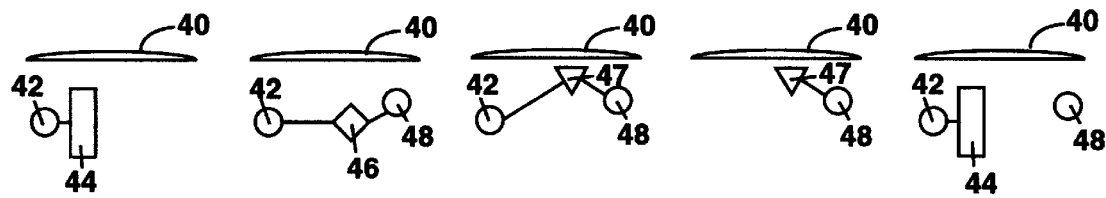

For a Streaming Process as illustrated in FIG. 6C, the molecule waits in Step A for the input handlers to register with the interface handler that they have data. When the interface handler is fulfilled, it proceeds to call the method handler. In Step B the method handler receives the input handler references, output handler name(s), and the method name from the interface handler. The method handler, which is chosen for the Streaming Process, acquires the output handler references, or, if it does not exist, it creates an output handler. In Step C the method handler calls the method 47 and passes the input and output handler references. The method now streams across the input and output handlers until the input data queue is empty, or the output handler no longer exists. In Step D, the last method result is passed to the output handler. In Step E the output handler sends the data to its output environment, and the molecule returns to waiting for the input handlers to queue more data.

Figure 6D:
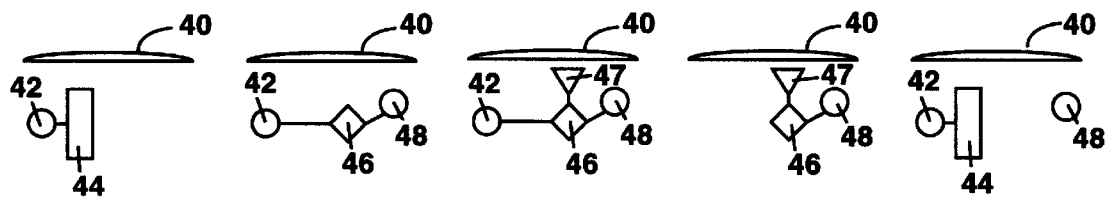

For Streaming a Block Process as illustrated in FIG. 6D, the molecule waits in Step A for the input handlers to register with the interface handler and, when fulfilled, proceeds to call the method handler. In Step B the method handler receives the input handler references, output handler name (s), and the method name from the interface handler, and acquires the output handler references or creates an output handler. In Step C the chosen method handler queries the input handler, calls the method with the input data, waits for the result, and passes the result to the output handler. If the input handler queue is not empty, the method handler repeats the steps until the queue is empty or the output handler no longer exists. In Step D, the last method result is passed to the output handler. In Step E the output handler sends the data to its output environment, and the molecule returns to waiting for the input handlers to queue more data.

In the operation of the logic web, a process begun on one computing machine may migrate elsewhere, continuing the operation on another available machine on the network, or on multiple machines with available resources. Only the part of the logic web that is active is essential to the operation.

Data Synchronization Example

Figure 7:
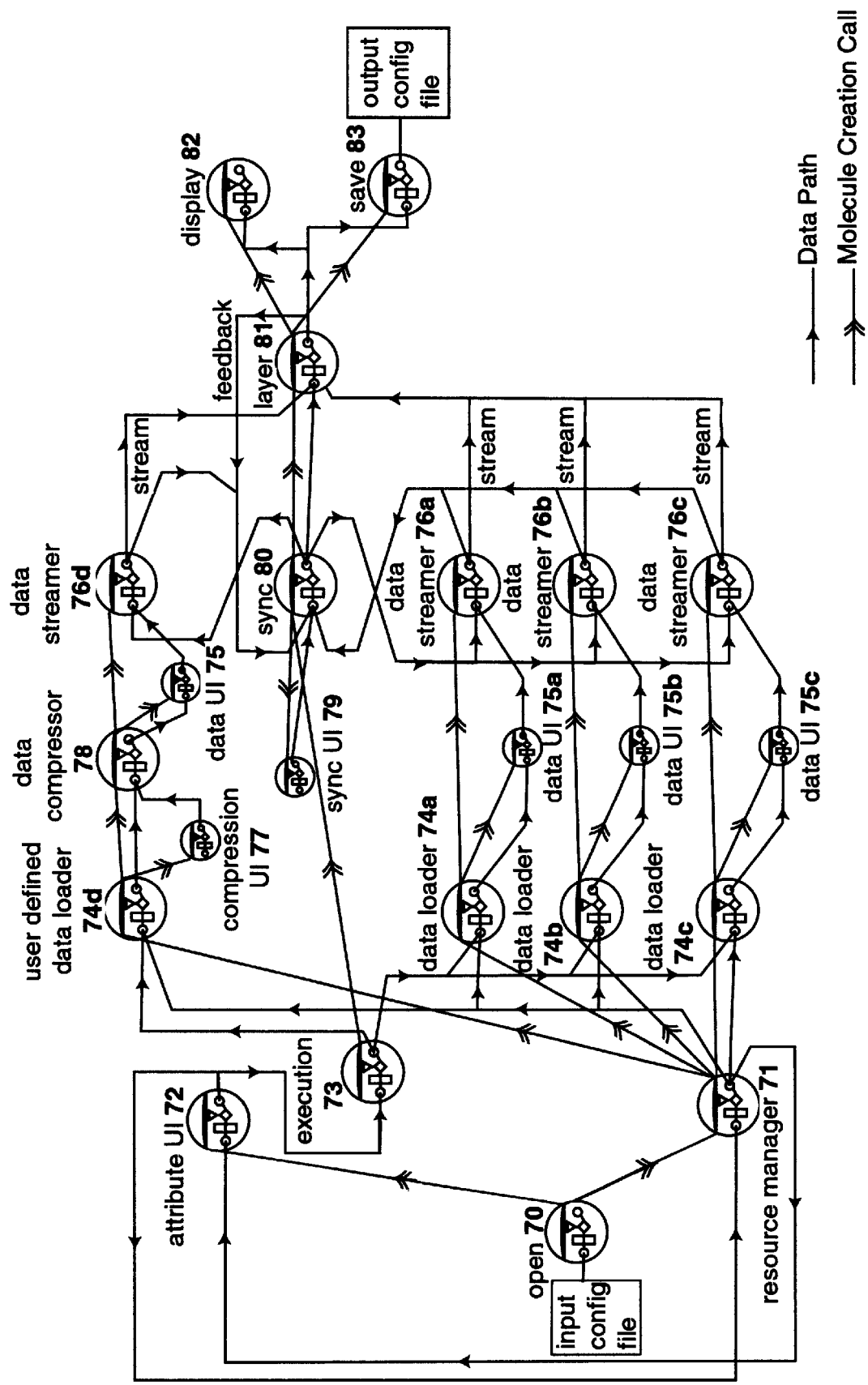
FIG. 7 illustrates how the novel computer processing and programming methods are applied to generate a logic web that can accomplish a data synchronization task.

A specific example will now be described with reference to FIG. 7 to illustrate how the computer processing and programming methods are applied to generate a logic web that can accomplish a given processing task, e.g., synchronizing data streams from different data sources, such as is commonly used for handling multimedia presentations. The initialization files create an Open molecule 70, which reads an input configuration file, and creates new molecules, Resource Manager 71 and Attribute User Interface 72. Resource Manager 71 queries the machine for available resources and establishes how many data sources the machine can handle (three in this example) given the criteria that the Open molecule has determined from the configuration file. Resource Manager 71 creates three Data Loaders 74*a*, 74*b*, 74*c*, and a User Defined Data Loader 74*d*.

Attribute User Interface 72 allows selection of attributes from the input configuration files, as well the creation of new attributes, and selection of file types and file names. It creates new custom data loaders upon user request, and an Execution molecule 73. Execution molecule 73 distributes file name, file type and file attributes, and creates new molecules including Sync molecule 80.

Data Loaders 74a, 74b, 74c locate the data, load the data into memory if there is enough memory, or stage the data to load in sections if necessary, prepare to pass the data, and create Data User Interface molecules 75a, 75b, 75c. These allow the user to offset the time frame of particular data streams to determine when each stream should begin, to scale a particular data stream to match the length of other streams, and to determine the duration of the data stream. Data Loaders also create Data Streamer molecules 76a, 76b, 76c which produce data streams which conform to the parameters provided, and creates new molecules.

User Defined Data Loader 74d creates Compression User Interface 77, which allows the user to control the amount of data compression, and Data Compressor 78 which compresses the data as per parameters provided. Data Compressor 78 creates Date User Interface 75 and Data Streamer 76d.

Sync molecule 80 creates Sync User Interface 79 which enables adjustment of a pulse rate and provides a count of how much time has elapsed since streaming began. The user may use this time count to stop, begin again, or move forward and backward in the data stream. Sync molecule 80 produces a synchronization pulse, maintains the list of available Data Streamers to send the pulse to, according to the parameters maintained by the Sync User Interface, and creates new molecules.

Sync molecule 80 also creates Layer molecule 81 which combines a number of input data streams into the number of specified output streams, and creates new molecules including Display molecule 82 and Save molecule 83. Display molecule 82 outputs the data on the screen, and Save molecule 83 outputs the data to disk, network, tape or other media.

The interaction of the components to produce the intended result will now be described. The user selects the initialization file for the Open molecule 70, which calls for the creation of the Attribute User Interface 72. Open 70 calls the Resource Manager 71. If there is already a resource manager in use on the machine or network, then that resource manager is used to redistribute the resources, otherwise a new resource manager is created. Resource Manager 71 calculates how many data streams can be handled comfortably, and calls to create the Data Loaders 74, one for each data stream (three in this example). It does this by looking at the input data files types, then at the generic size of a file of that type, then at the memory resources available, and determines from those parameters how many loaders it can make without crashing memory.

The user selects one name and one file type for each available Data Loader 74 in the Attribute User Interface 72. If the user has picked more file types than the available Data Loaders 74, then the Attribute User Interface 72 requests an additional Data Loader 74 from Resource Manager 71. The creation of data loaders is customizable to the extent that the user may request a file type that is not in the Attribute User Interface list. In this case, the name and path to User Defined Data Loader 74d would be given. This gives the system flexibility to accept data types which have not been predetermined. The user also determines the attributes, or parameters to be passed to execution in Attribute User Interface 72.

Execution 73 calls for creation of the Sync 80 molecule, which calls for creation of the Layer 81 molecule. The Layer 81 molecule in turn calls for creation of Display 82 and Save 83 molecules. The Sync 80 maintains a list of names it will send a synchronization pulse to, as informed by the Data Streamers.

At execution, file names, types and attributes are passed to the Data Loaders. As soon as the Data Loaders get the file names, types and attributes, they are fulfilled and will locate the data and begin to load data into memory. If there is not enough memory available, it will stage the data to load in sections. Data Loaders then call to create Data User Interface 75 and Data Streamer 76. This process occurs for each of the Data Loaders and User Defined Data Loader that are fulfilled with file names, file types, and attributes.

In the event that Resource Manager 71 detects that the resources are becoming sparse, it will pass a request to the Data Loaders to invoke data compression. The Data Loaders will then request appropriate data compression to Data Compressor 78. In the event one of the attributes calls for compressed data, the Data Loaders will send the data to Data Compressor 78. The Compression User Interface 77 may be accessed to adjust compression parameters.

The user then selects the duration and start point of each data stream in the Data User Interface 75. The user may offset or scale the time frame of particular data streams to match the length of other streams. When a Data Streamer 76 is fulfilled with the parameters sent by the Data User Interface 75, it passes its reference name to Sync 80, informing it that the data are ready to stream. The Sync 80 will then add that reference name to the list of names it will pulse to. The list is comprised of the references names of any Data Streamer in the system at the time. If there is no longer data ready to stream in a Data Streamer, the reference name will be removed from the Sync 80 list. The number of references in the list of names will also be passed to the Layer 81 component.

The Sync 80 begins to deliver its pulse to the Data Streamers 76, which deliver the data to the Layer 81 component. If the Layer 81 component does not receive all the data streams on the list, it will request that the Sync 80 slow down the pulse until all the data arrives at the Layer 81 at the same time. The Layer 81 component passes the data to the Display 82, and calls the Save 83 component. If at any point the user wishes to intervene in the data stream to pause, stop, or move back in the time count, the user may do so in the Sync User Interface 79.

There are several advantages to using the logic web programming method in the data synchronization example. Due to the dynamic configuration capability, there can be multiple users using synchronization systems on a given machine or network at the same time and each will be distributed data synchronization resources by the resource manager. The ability to perform this accomplishes automatic load balancing, which normally takes an additional load-balancing specific software application. Since the user can create any user defined data loader as needed, the system can accommodate any data format. The system dynamically pre-formats and pre-processes data. The system will also determine when compression is needed without user intervention if desired. The data compressor will automatically compress in response to fulfilled conditions. It will also reformat data to the network file type as listed in the data loader. Taking into account hardware resources, the system will adaptively deliver a variety of data sources to the display in sync interactively. The system is also distributed and platform independent. Any one of the components can reside on any machine on a LAN, WAN, or Internet network.

In a parallel processing environment, multiple synchronization logic webs distributed over multiple CPUs can be coordinated to deliver parallel data streams to a common layer.

The molecule is the fundamental element of the logic web programming method. It carries with it the essential functions normally associated with larger applications, including memory management, invoking functions, and cleanup. It is small in footprint, very flexible, and dynamically reconfigurable (adaptive). It functions as a connector for local component networking, as well as remote networking over dissimilar hardware environments. The logic web programming paradigm allows truly autonomous processes with seamless compatibility between functional units, without the need for centralized processing management or highly predictive scheduling and coordination.

Industrial Applicability

With the computer processing and programming method of the invention, complex computational and data processing tasks can be performed by designing logic webs constructed of component molecules that utilize any available computing resources of any type and in any location on any network. It is thus ideally suited for performing processing tasks in distributed computing and parallel processing environments. Logic webs can be designed with molecules that operate with any type of legacy system, applications programmed in different languages, and data of any type stored in any format, thus enabling much more efficient programming of data integration tasks, as well as the creation of entirely new types of data integration systems.

The logic web programming method can be applied to any field by adapting its components to industry specific interfaces and functionality. For example, it can be applied to data integration, modeling, simulation, data visualization, animation, rendering, and modular production applications. For current Internet-based applications, it can be tailored to current market requirements with simplicity, integrating these considerations: server-based computing model; inherent scalability; JAVA™ based core functions and extensions; Web browser technology for delivery; ability to manage terabyte data sets; ubiquitous database model with integrated functionality; customized built-in functions; distributed end user precepts and design premise; modular sequence data flows; and phased implementation approach.

The logic web programming method is particularly suited for data visualization applications, such as data center and system monitoring, visual corporate helm, decision support systems, complex relational displays, and scientific modeling visualization. Logic web software can operate as a nonlinear scene graph with parallel, decentralized, synched and tracked object-oriented sequences. The advantages of the logic web's modular approach are especially apparent when coupled with a visual interface. The molecules are single method so that the method names them. Since the connection or binding of the methods is inherent to the molecule, the logic web can be assembled quickly by human-oriented function names or visual cues with almost no regard to internal operation. Simply running the logic web will invoke self-diagnostics at any point of failure. Monitored visually in an optimization support environment, this programming method will extend the capability to "program" computers to the computer-literate layperson. An appropriate analogy would be simplifying the programming of complex data processing tasks to the level of assembling pipes and fittings by identifying the needed parts and hooking the pieces together.

It is understood that many modifications and variations may be devised given the above description of the principles of the invention. It is intended that all such modifications and variations be considered as within the spirit and scope of this invention, as it is defined in the following claims.

We claim:

1. A computer processing method comprising the steps of:

creating a plurality of software entities ("molecules") each of which is configured with software microcomponents including a signal handler, at least one input handler, at least one output handler, an interface handler, and at least one method handler for an associated method, said input handler, output handler, and signal handler being operative for sending and receiving communication signals to or from another molecule or logic web externally of the respective molecule and being operatively connected to the other microcomponents, said at least one input handler being operative for queuing input data, said interface handler being operative for determining when a predefined input conditional for required input data to be received by said input handler is fulfilled and then invoking said method handler, said method handler being operative for invoking said associated method for processing the input data, and said at least one output handler being operative for outputting a result of the processing of input data by said method;

storing the created molecules in a library for later run time use;

deploying on a given computing resource a logic web comprising a plurality of molecules selected to perform a given processing task by invoking a first molecule to be retrieved from the library and executed on the given computing resource; and said first molecule invoking one or more other molecules to incrementally extend said logic web "on the fly" by said signal handler of said first molecule sending a communication signal to invoke said other molecule(s).

2. A computer processing method according to claim 1, wherein said creating step includes creating a plurality of logic webs each having its web of software entities configured to perform a data processing task with a computing resource autonomously, and said deploying step includes deploying the plurality of logic webs with respective ones of a plurality of computing resources, respectively.

3. A computer processing method according to claim 2, wherein said plurality of computing resources are distributed on a network in a distributed computing environment.

4. A computer processing method according to claim 2, wherein said plurality of computing resources include an array of central processing units (CPUs) in parallel in a parallel processing environment.

5. A computer processing method according to claim 1, wherein the at least one logic web is comprised of a plurality of molecules, and said logic web exists as initialization files for generating an initial host of molecules which invoke and generate other molecules in successive layers of incremental processing steps.

6. A software programming method comprising the steps of:

creating a plurality of software entities ("molecules") each of which is configured with software microcomponents including a signal handler, at least one input handler, at least one output handler, an interface handler, and at least one method handler for an associated method, said input handler, output handler, and signal handler being operative for sending and receiving communication signals to or from another molecule externally of the respective molecule and being operatively connected to the other micro-components, said at least one input handler being operative for queuing input data, said interface handler being operative for determining when a predefined input conditions for required input data is fulfilled and invoking said method handler, said method handler being operative for invoking said associated method for processing the input data, and said at least one output handler being operative for outputting a result of the processing of input data by said method;

storing the created molecules in a library for later run time use;

deploying a first molecule on a given computing resource by retrieving said first molecule from the library and executing it on the given computing resource; and invoking one or more other molecules to be executed on the given computing resource by said first molecule sending a communication signal to invoke said other molecules.

7. A software programming method according to claim 6, wherein said creating step includes creating an initialization file for the at least one molecule by specifying its software micro-components in a selected programming language.

8. A software programming method according to claim 6, further comprising the step of maintaining a library of software micro-components in a plurality of handler types identified by name, and wherein said creating step includes invoking the names of selected handler types for the software micro-components of the molecule to be retrieved from said library.

9. A software programming method according to claim 6, wherein said interface handler includes means for providing the molecule with the characteristic of autonomously waiting, looking, and proceeding with said associated method for processing the input data by waiting until said input handler indicates that the predefined input conditions are present before invoking said method handler for the associated method.

10. A software programming method according to claim 6, wherein said interface handler includes a plurality of means for determining when respective predefined input conditions for the presence of respectively required data is fulfilled and for invoking respective ones of a plurality of method handlers and associated methods.

11. A software programming method according to claim 6, wherein said input handler is selected from one of a plurality of input handler types corresponding respectively to a plurality of different data source types.

12. A software programming method according to claim 6, wherein a plurality of molecules are created in said creating step and configured in a logic web to perform a data processing task.

13. A software programming method according to claim 12, wherein said creating step includes creating molecules having means for creating next molecules in successive layers of incremental processing steps.

14. A software programming method according to claim 6, wherein said creating step includes creating molecules having built-in means for performing a clean-up of its functions when the molecule is to be terminated.

15. A software programming method according to claim 6, wherein said creating step includes creating molecules having means for recording information on the state of its micro-component handlers and signaling such state information externally through said signal handler.

16. A software programming method according to claim 6, wherein said signal handler can receive signals for and has means for dynamically reconfiguring the micro-component handlers of the molecule while it is in existence to perform a processing task.

17. A software entity ("molecule") comprising, as software micro-components:

a signal handler for invoking the other software micro-components;

at least one input handler for queuing input data;

at least one output handler for outputting a result of processing of input data by a method;

an interface handler for determining when a predefined condition for required input data is fulfilled and invoking a method handler; and at least one method handler for invoking an associated method for processing input data queued by an input handler;

wherein said signal handler includes configuration data which are used by the signal handler to send communication signals for invoking another molecule externally of the molecule to be executed incrementally in a processing task with said first-mentioned molecule; and wherein the software entity is assigned to a selected computing resource to process a source of input data.

18. A software entity according to claim 17, wherein said interface handler includes means for providing the molecule with the characteristic of autonomously waiting, looking, and proceeding with said associated method for processing the input data by waiting until said input handler indicates that the predefined input conditions are present before invoking said method handler for the associated method.

19. A software entity according to claim 17, wherein said interface handler includes a plurality of means for determining when respective predefined input conditions for the presence of respectively required data is fulfilled and for invoking respective ones of a plurality of method handlers and associated methods.

20. A software entity according to claim 17, wherein said input handler is selected from one of a plurality of input handler types corresponding respectively to a plurality of different data source types.

* * * * *